US012781933B2

(12) United States Patent
Paul

(10) Patent No.: US 12,781,933 B2

(45) Date of Patent: Nov. 3, 2026

(54) OPTICAL PROJECTION DEVICE COMPRISING THREE LENSES

(71) Applicant: VALEO VISION, Bobigny (FR)

(72) Inventor: Baptiste Paul, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/710,889

(22) PCT Filed: Nov. 21, 2022

(86) PCT No.: PCT/EP2022/082674

§ 371 (c)(1),
(2) Date: May 16, 2024

(87) PCT Pub. No.: WO2023/094332

PCT Pub. Date: Jun. 1, 2023

(65) Prior Publication Data

US 2025/0020299 A1 Jan. 16, 2025

(30) Foreign Application Priority Data

Nov. 25, 2021 (FR) ....................................... 2112549

(51) Int. Cl.
*F21S 41/25* (2018.01)
*F21S 41/143* (2018.01)
(Continued)

(52) U.S. Cl.
CPC ............. *F21S 41/25* (2018.01); *F21S 41/143* (2018.01); *F21S 41/663* (2018.01); *F21S 43/14* (2018.01); *F21S 43/26231* (2024.05); *F21S 43/26411* (2024.05); *F21W 2102/13* (2018.01); *F21W 2102/165* (2018.01)

(58) Field of Classification Search
CPC ........ F21S 41/25; F21S 41/143; F21S 41/663; F21S 43/14; F21S 43/26231; F21S 43/26411; F21W 2102/13; F21W 2102/165; G02B 13/16; G02B 13/0035
See application file for complete search history.

(56) References Cited

U.S. PATENT DOCUMENTS

| | | | | |
|---|---|---|---|---|
| 10,591,126 B2 | 3/2020 | Mandl | | |
| 2017/0234497 A1* | 8/2017 | Courcier | F21S 41/143 362/509 | |
| 2019/0086051 A1* | 3/2019 | Motohashi | F21S 41/153 | |

FOREIGN PATENT DOCUMENTS

| | | |
|---|---|---|
| EP | 0493800 A2 | 7/1992 |
| JP | H05134172 H | 5/1993 |

(Continued)

OTHER PUBLICATIONS

European Patent Office, International Search Report (with English translation) and Written Opinion of corresponding International Application No. PCT/EP2022/082674, dated Feb. 10, 2023.

*Primary Examiner* — Elmito Breval

(74) *Attorney, Agent, or Firm* — Valeo Vision

(57) ABSTRACT

The invention relates to an optical device for projecting light beams, capable of cooperating with a pixelated light source, including a plurality of selectively activatable emissive elements, which consists of the following components, arranged in succession along the path of the light rays from the source: a convergent first lens, a divergent or neutral second lens, a pupil and a convergent third lens.

13 Claims, 2 Drawing Sheets

(51) Int. Cl.

| | |
|---|---|
| ***F21S 41/663*** | (2018.01) |
| ***F21S 43/14*** | (2018.01) |
| ***F21S 43/20*** | (2018.01) |
| *F21W 102/13* | (2018.01) |
| *F21W 102/165* | (2018.01) |

(56) References Cited

FOREIGN PATENT DOCUMENTS

| | | |
|---|---|---|
| JP | 2017009778 A | 1/2017 |
| JP | 2021081663 A | 5/2021 |

* cited by examiner

OPTICAL PROJECTION DEVICE COMPRISING THREE LENSES

TECHNICAL FIELD

The present invention relates to the field of lighting and/or signaling and to the units, optical units in particular, that contribute thereto. It is particularly advantageously applicable to the field of automotive vehicles.

BACKGROUND OF THE INVENTION

In the automotive sector, devices capable of emitting light beams, also called lighting and/or signaling functions, that generally comply with regulations, are known.

Technologies that allow a segmented beam, also called a pixelated beam, to be produced, in order to perform advanced lighting functions, have recently been developed. This is especially the case for a "complementary high-beam" lighting function, which is generally based on a plurality of illuminating units each comprising one light-emitting diode, which diodes may be driven individually. This beam may in particular serve to supplement the lighting provided by a low beam, so as to form a high overall beam.

The beam, which results from the various beam segments generated by each of the diodes, is projected by means of a projecting optical system comprising a plurality of lenses. For example, it is possible to produce a complementary beam, which is associated with a basic beam that is entirely or at least mainly projected below a horizontal cut-off line of the type used for the low-beam function, the complementary beam being added to the basic beam so as to complete it above the cut-off line; advantageously, this complementary beam is adaptive, i.e. certain portions of the projected overall beam may be turned on or off, for example for anti-glare functions. The acronym ADB (for adaptive driving beam) is used for this type of function.

In the present description, a beam the projection of which forms an image composed of beam segments, each segment being able to be turned on independently, is called a segmented beam. A pixelated light source may be employed to form these segments. Such a source comprises a plurality of selectively activatable emissive elements. The emissive elements are typically placed beside one another on a carrier, with a certain pitch.

In order to project with sufficient quality the light generated by the emissive elements, lens trains are currently used that make it possible to reduce the effects of chromatic aberration at the edge of unlit pixels while obtaining the highest possible efficiency and a sufficient sharpness.

FIG. 1 is a very schematic illustration of an illuminated region in front of a vehicle (hatched portion) within which two unlit regions 6 have been formed by inactivating at least one emissive element for each of these two regions 6. Typically, the optical treatment of the light must allow the effects of chromatic aberration on the edge 61 of the regions 6 to be avoided or limited (otherwise, the observer of the illuminated scene will notice an undesirable colored edge that may even be incompatible with beam standards); at the same time, the projection of each of the pixels should be as sharp as possible so that the outline 61 of the regions 6 is not perceived to be blurred. These optical requirements currently require relatively complex lens systems to be used.

One aim of the present invention is in particular to provide a solution to this problem, and to thereby achieve satisfactory resolutions and correction of chromatic aberration while using less complex devices, in particular for ADB beams.

The other aims, features and advantages of the present invention will become apparent upon studying the following description and the accompanying drawings. It will be understood that other advantages may be incorporated.

SUMMARY OF THE INVENTION

To achieve this objective, according to one embodiment, an optical device for projecting light beams is provided that is able to interact with a pixelated light source comprising a plurality of selectively activatable emissive elements, characterized in that it consists of, successively in the direction of the path of light rays generated by the source: a convergent first lens, a divergent or neutral second lens, a pupil, and a convergent third lens.

Thus, a segmented beam resulting from projection of light generated by the plurality of emissive elements is produced with a small number of lenses (surprisingly limited to three) while obtaining satisfactory optical-treatment conditions in respect of the sharpness of the projection and the limitation of chromatic-aberration effects at the edge of unlit regions.

Placing the pupil between the second lens and the third lens allows the optical device to project more light rays, and therefore the projected image to have a high luminous intensity. By way of example, the optical device may have a numerical aperture N less than or equal to 0.7, or even less than 0.5.

Optionally, the pupil is placed at about the same distance from the exit face of the second lens as from the entry face of the third lens. Specifically, in this configuration, the sharpness of the projection is improved. Generally, the combination formed by the second lens and the third lens moreover advantageously ensures at least partial correction of chromatic-aberration effects.

Another aspect relates to a module comprising the device and a pixelated light source that is equipped with a plurality of selectively activatable emissive elements, and that is configured to emit a segmented light beam.

Another aspect relates to an automotive vehicle equipped with at least one optical system and/or at least one optical device.

BRIEF DESCRIPTION OF THE DRAWINGS

Aims, objects, features and advantages of the invention will become more clearly apparent from the detailed description of one embodiment of the invention, which embodiment is illustrated by the following accompanying drawings, in which.

Figure 1:
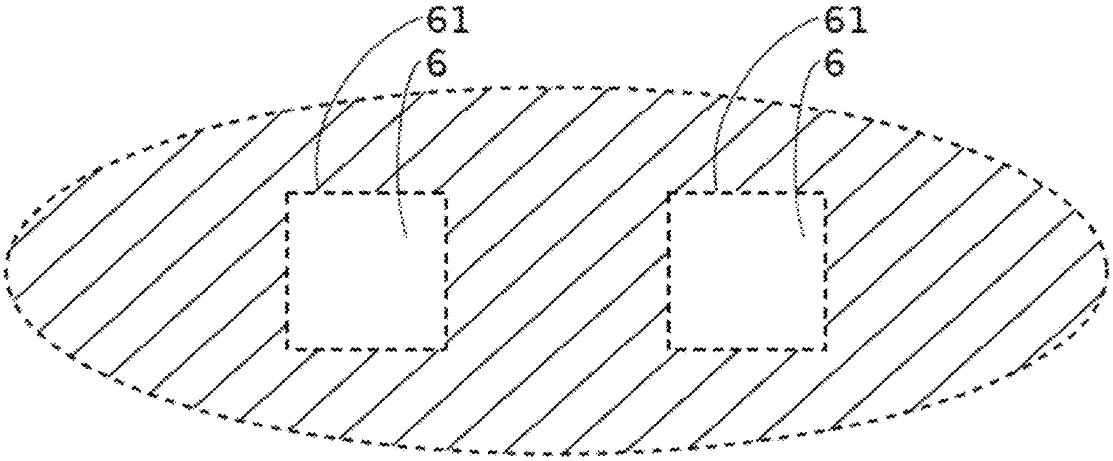
FIG. 1 shows one example of projection of a light beam into a plane, with unlit regions.

The drawings are provided by way of example and do not limit the invention. They are schematic conceptual depictions intended to facilitate understanding of the invention and are not necessarily drawn to the scale of practical applications.

DETAILED DESCRIPTION OF THE INVENTION

Before starting a detailed review of embodiments of the invention, optional features that may optionally be used in combination or alternatively will now be described:

the first lens 2 is a meniscus lens;

the second lens 3 has an exit face 32 having a center located on the optical axis of the device, the third lens 5 has an entrance face 51 having a center located on the optical axis of the device, and the pupil 4 is placed so as not to make contact with the exit face 32 of the second lens 3 and with the entrance face 51 of the third lens 5;

the pupil 4 is placed at a distance from the center of the exit face 32 of the second lens 3 comprised between 25% and 75% of the distance between the center of the exit face 32 and the center of the entrance face 51 of the third lens 5;

the pupil 4 is placed at a distance from the center of the exit face 32 of the second lens 3 comprised between 45% and 55% of the distance between the center of the exit face 32 and the center of the entrance face 51 of the third lens 5;

the pupil makes contact with the edge of the exit face 32 of the second lens 3;

the first lens 2 comprises an entrance face directly receiving light from the pixelated light source;

the second lens 3 is a meniscus lens;

the third lens 5 is configured to produce a projection of the segmented light beam in front of a vehicle;

the third lens 5 is a lens of uniform refractive index;

module comprising a unit for driving the activation of each of the emissive elements that is configured to produce at least one dark region in a projected beam by deactivating a group of adjacent emissive elements, the driving unit being configured to determine the number of emissive elements of the group of adjacent emissive elements corresponding to the dark region depending on the widthwise dimension of the emissive elements;

the light beam forms at least part of an overall high beam;

the second lens 3 is made of flint glass;

the third lens 5 is made of crown glass;

the first lens 2 is made of crown glass;

the plurality of emissive elements 1 forms a rectangular array, the long dimension of the rectangular array being directed in the direction of a widthwise dimension of the beam, the widthwise dimension preferably being aligned with the horizon line.

The system according to the invention may comprise a unit for driving the activation of each of the emissive elements that is configured to produce at least one dark region forming a tunnel in a projected beam by deactivating a group of adjacent emissive elements, the driving unit being configured to determine the number of emissive elements of the group of adjacent emissive elements corresponding to the dark region depending on the widthwise dimension of the emissive elements.

The driving unit may comprise a computer program product, preferably stored in a non-transitory memory, the computer program product comprising instructions that, when they are executed by a processor, make it possible to determine the emissive elements to be activated, in particular to obtain at least one dark region (in which the elements are not activated) of defined area, taking into account the variable area of the images of the elements.

In the features described below, terms relating to verticality, horizontality and transversality (or even the lateral direction), or equivalents thereof, are to be understood with respect to the position in which the lighting system is intended to be fitted in a vehicle. The terms “vertical” and “horizontal” are used in the present description to designate, regarding the term “vertical”, a direction with an orientation perpendicular to the plane of the horizon (which corresponds to the height of the systems), and, regarding the term “horizontal”, a direction with an orientation parallel to the plane of the horizon. They are to be considered under the conditions of operation of the device in a vehicle. The use of these words does not mean that slight variations about the vertical and horizontal directions are excluded from the invention. For example, an inclination relative to these directions of the order of + or −10° is here considered to be a minor variation about the two preferred directions. With respect to the horizontal plane, the inclination is in principle between −5° and 4°, and it is between −6° and 7.5° laterally.

Automotive-vehicle headlamps may be equipped with one or more luminous modules arranged in a housing closed by an outer lens so as to obtain one or more lighting and/or signaling beams as output from the headlamp. A vehicle may be equipped with a module of the invention, and, preferably, said vehicle is also equipped with at least one other module for projecting at least one other beam. A headlamp may also be complex and comprise a plurality of modules that may, furthermore, optionally share components.

The invention may contribute to a high-beam function the purpose of which is to illuminate a large extent of the scene in front of the vehicle, but also to a distance away that is substantial, and typically about two hundred meters. This light beam, due to its lighting function, is mainly located above the horizon line. It may for example have a slightly upward sloping lighting optical axis. In particular, it may be used to generate a “complementary beam” lighting function that forms a portion of a high beam complementary to the one produced by a near-field beam, the complementary high beam seeking entirely, or at least mainly, to illuminate above the horizon line, whereas the near-field beam (which may have the specific features of a low beam) seeks to illuminate entirely, or at least mainly, below the horizon line.

The device may also serve to form other lighting functions via or apart from those described above in relation to adaptive beams.

It will be noted that the plurality of emissive elements may be controlled so as to be activated selectively. This means that all the emissive elements are not necessarily active, i.e. emit light, simultaneously. This function allows the shape of the generated beam to be modulated. If an emissive element is not activated, its image, such as projected by the optical device, will be absent. It then forms an illumination vacuum in the resulting overall beam. This vacuum would be complete if it were not for source-coupling effects and the effects of stray light from the optics.

The source preferably comprises a carrier, one side of which bears selectively activatable emissive elements 1, for example based on LED technologies, as described in detail below.

The light source is advantageously an array of emissive elements 1 centered on, and perpendicular to, the optical axis of the optical device which follows it, here represented by a group of three lenses. The optical axis may be oriented substantially horizontally.

The light source may in particular take the form of an array of emissive elements that may be activated individually, so as to turn off or turn on any one of the emissive elements. The shape of the resulting beam may thus be varied with a very high degree of flexibility.

In a manner known per se, the present invention may use light-emitting diodes (also commonly called LEDs) as light sources. These may potentially be one or more organic LEDs. These LEDs may in particular comprise at least one semiconductor chip able to emit light. Moreover, the expression light source is here understood to mean a set of at least one elementary source such as an LED able to produce a flux that causes at least one light beam to be output from the module of the invention. In one advantageous embodiment, the exit face of the source is of rectangular cross section, this being typical for LED chips.

The electroluminescent source preferably comprises at least one monolithic array of electroluminescent elements, also called a monolithic matrix array. In a monolithic array, the electroluminescent elements are grown from a common substrate, or have been transferred thereto, and are electrically connected so as to be able to be activated selectively, individually or in subsets of electroluminescent elements. The substrate may be made mainly of semiconductor. The substrate may comprise one or more other materials, which are for example non-semiconductors. Each electroluminescent element or group of electroluminescent elements may thus form one luminous pixel and is able to emit light when its or their material is supplied with electricity. The configuration of such a monolithic array allows selectively activatable pixels to be arranged very close to one another, with respect to conventional light-emitting diodes, which are intended to be soldered to printed circuit boards. In the context of the invention, the monolithic array comprises electroluminescent elements a main dimension of elongation of which, namely height, is substantially perpendicular to a common substrate, this height being at most equal to one micron.

Advantageously, the one or more monolithic arrays able to emit light rays may be coupled to a control unit for controlling the light emission of the pixelated source. The control unit may thus control (or drive) the generation and/or the projection of a pixelated light beam by the luminous device. The control unit may be integrated into the luminous device. The control unit may be mounted on one or more of the arrays, the assembly thus forming a luminous module. The control unit may comprise a central processing unit coupled to a memory storing a computer program that comprises instructions allowing the processor to perform steps that generate signals allowing the light source to be controlled. The control unit may thus for example individually control the light emission of each pixel of an array. Furthermore, the luminance obtained by the plurality of electroluminescent elements is at least 60 Cd/mm2, and preferably at least 80 Cd/mm2.

The control unit may form an electronic device able to control the electroluminescent elements. The control unit may be an integrated circuit. An integrated circuit, also called an electronic chip, is an electronic component that reproduces one or more electronic functions and is able to integrate several types of basic electronic component, for example in a limited volume (i.e. on a wafer). This makes the circuit easy to implement. The integrated circuit may be for example an ASIC or an ASSP. An ASIC (acronym for application-specific integrated circuit) is an integrated circuit developed for at least one specific application (i.e. for one customer). An ASIC is therefore a specialized (microelectronic) integrated circuit. Generally speaking, it groups together a high number of unique or made-to-measure functions. An ASSP (acronym of application-specific standard product) is an integrated (microelectronic) electronic circuit that performs a high number of functions in order to meet the requirements of a generally standardized application. An ASIC is designed for a more particular (specific) need than an ASSP. The monolithic arrays are supplied with electricity via the electronic device, which is itself supplied with electricity using for example at least one connector connecting it to a source of electricity. The source of electricity may be internal or external to the device according to the invention. The electronic device supplies electricity to the light source. The electronic device is thus able to control the light source.

According to the invention, the light source preferably comprises at least one monolithic array the electroluminescent elements of which protrude from a common substrate. This arrangement of elements may result from growth on the substrate, from which substrate said elements were respectively grown, or from any other production method, for example transfer of the elements using transfer techniques. Various arrangements of electroluminescent elements may meet this definition of a monolithic array, provided that the electroluminescent elements have one of their main dimensions of elongation substantially perpendicular to a common substrate and that the spacing between the pixels, formed by one or more electroluminescent elements grouped together electrically, is small in comparison with the spacings that are imposed in known arrangements of generally flat square chips soldered to a printed circuit board.

In particular the light source, according to one aspect of the invention, may comprise a plurality of electroluminescent elements that are distinct from one another and that are grown individually from the substrate, these elements being electrically connected so as to be selectively activatable, where appropriate in subsets within which rods may be activated simultaneously.

According to one embodiment that is not shown, the monolithic array comprises a plurality of electroluminescent elements, of submillimeter dimensions, or even dimensions of less than 10 μm, which are arranged projecting from a substrate so as to form rods with an in particular hexagonal cross section. The electroluminescent rods extend parallel to the optical axis of the luminous module when the light source is in position in the housing.

These electroluminescent rods are grouped, in particular via electrical connections specific to each set, into a plurality of selectively activatable portions. The electroluminescent rods are rooted on a first side of a substrate. Each electroluminescent rod, formed here using gallium nitride (GaN), protrudes perpendicularly, or substantially perpendicularly, from the substrate, which here is based on silicon, with other materials such as silicon carbide being usable without departing from the scope of the invention. By way of example, the electroluminescent rods could be made of an alloy of aluminum nitride and of gallium nitride (AlGaN), or of an alloy of aluminum, indium and gallium phosphide (AlInGaP). Each electroluminescent rod extends along an axis of elongation defining its height, the base of each rod being placed in a plane of the top side of the substrate.

According to one other embodiment (not shown), the monolithic array may comprise electroluminescent elements formed from electroluminescent-element layers, in particular a first layer of n-doped GaN and a second layer of p-doped GaN, grown epitaxially on a single substrate, for example one made of silicon carbide, and which are sliced (by grinding and/or ablation) to form a plurality of pixels respectively originating from the same substrate. The result of such a design is a plurality of electroluminescent blocks that all originate from the same substrate and that are electrically connected so that each thereof can be selectively activated.

In one example of implementation according to this other embodiment, the substrate of the monolithic array may have a thickness of between 100 μm and 800 μm, and in particular equal to 200 μm; each block may have a length and a width, each being between 50 μm and 500 μm, and preferably between 100 μm and 200 μm. In one variant, the length and width are equal. The height of each block is smaller than 500 μm, and preferably smaller than 300 μm. Lastly, the exit surface of each block may be formed via the substrate, on the side opposite the one on which the epitaxial growth is performed. The distance separating contiguous pixels may be smaller than 1 μm, in particular smaller than 500 μm, and it is preferably smaller than 200 μm.

According to one other embodiment (not shown), which is applicable both to electroluminescent rods that respectively protrude from the same substrate, i.e. rods such as described above, and to electroluminescent blocks obtained by slicing electroluminescent layers superposed on the same substrate, the monolithic array may furthermore comprise a layer of a polymer in which the electroluminescent elements are at least partially embedded. The layer may thus extend over the entire extent of the substrate, or only around a given group of electroluminescent elements. The polymer, which may in particular be silicone-based, creates a protective layer that allows the electroluminescent elements to be protected, without hindering the diffusion of the light rays. Furthermore, it is possible to integrate, into this layer of polymer, wavelength-converting means, luminophores for example, that are able to absorb at least some of the rays emitted by one of the elements and to convert at least some of said absorbed exciting light into emitted light having a wavelength different to that of the exciting light. The luminophores may either be embedded in the bulk of the polymer, or be arranged on the surface of the layer of polymer. It is also possible to vacuum-deposit phosphors on semiconductor chips, without the polymer layer. The light source may furthermore comprise a coating of reflective material in order to deflect light rays toward the exit surfaces of the pixelated source.

The electroluminescent elements of submillimeter dimensions define, in a plane substantially parallel to the substrate, a given exit area. It will be understood that the shape of this exit area is dependent on the number and arrangement of the electroluminescent elements that form it. It is thus possible to define an emission area of substantially rectangular shape, though it will be understood that the latter may vary and be any shape without departing from the scope of the invention.

It is not impossible for the selectively activatable emissive elements 1 to be secondary light sources.

FIG. 1 shows an example of the projection able to be obtained by virtue of the invention, with a sufficient sharpness and an outline 61 that is sufficiently colorless (close to the white color of the source).

Figure 2:
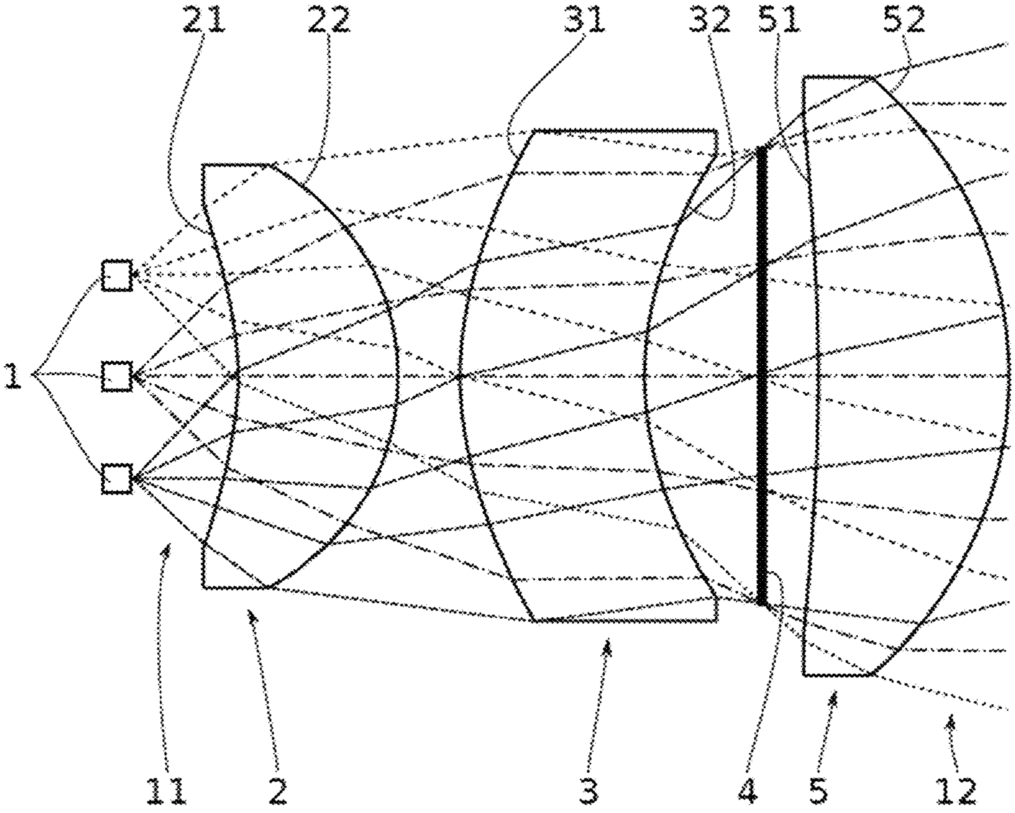
FIG. 2 shows a first example of embodiment of the invention.

A first embodiment of an optical module allowing such a result to be achieved has been shown in FIG. 2. The path of the light rays, from left to right, starts with generation of rays 11 by the emissive elements 1 of the source, which preferably forms an array of pixels.

By way of example, the array of pixels of the source 1 may have an elongate rectangular shape, cleverly arranged in the horizontal direction.

FIG. 2 shows the rays 11 entering a first lens 2 of the optical device through an entrance face 21. In this example, the first lens 2 is a meniscus lens and therefore has faces 21, 22 of same direction of curvature. Here, the entrance face 21 is concave and the exit face 22 is convex. The first lens 2 is convergent in nature and it is configured to direct the light rays that it transmits toward a second lens 3 that is spaced apart from the first lens 2.

The second lens 3 is advantageously divergent, but it may be weakly divergent, or even optically neutral. In the case of FIG. 2, the entrance face 31 is convex and its exit face 32 concave.

Along the path of the light rays, the second lens 3 is followed by a pupil 4. The latter acts as a diaphragm of preferably set aperture (so as to form a peripheral stop with respect to said rays) and defines an aperture for passage of rays in the direction of a third lens 5. Advantageously, the pupil 4 lies in a plane perpendicular to the optical axis. In the example shown, the pupil 4 is distant from the exit face 32 of the second lens 3 and from the entrance face 51 of the third lens 5. Specifically, an intermediate location is preferred for the pupil 4 to increase sharpness.

The third lens for its part is a convergent lens. In the case of FIG. 2, its entrance face 51 is concave and its exit face 52 convex. Preferably, the rays 12 projected by the third lens 5 form the pixelated light beam exiting the module and illuminating a portion of a road scene in front (or behind) a vehicle equipped with the module.

Preferably, the pupil 4 is placed intermediate between the face 32 and the face 51. More particularly, it is possible to make it so that the center of the face 32 (defined as the intersection of this face with the optical axis of the optical device itself, i.e. the horizontal dash-dotted line in the middle of the figure) and the center of the face 51 (defined similarly to the center of the face 32) define a distance of separation of the lenses at the center of their facing faces; the pupil 4 may be placed at a distance from the face 32 comprised between 25 and 75% of this distance of separation. Optionally, the centrality of the pupil 4 may be greater, with a distance to the center of the face 32 between 45 and 50% of the distance of separation, with a view to increasing sharpness, though this will be to the detriment of the compensation of chromatic aberration.

Figure 3:
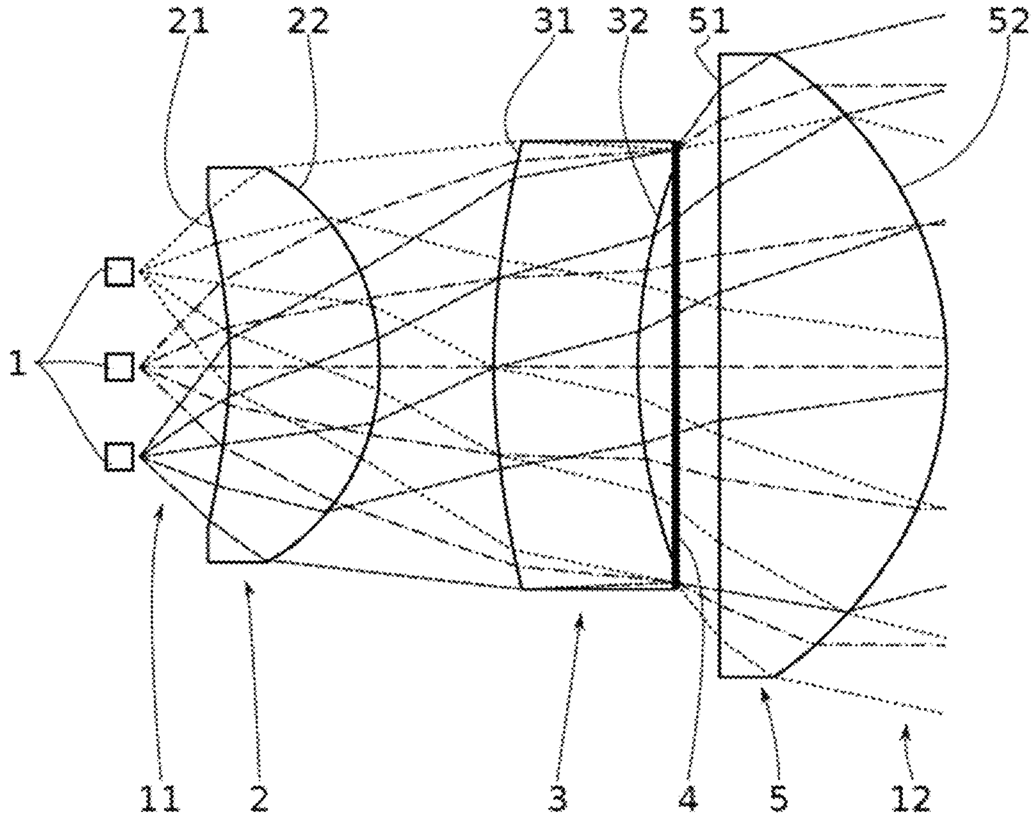
FIG. 3 shows another embodiment.

Another embodiment of the projecting module will now be described with reference to FIG. 3. FIG. 3 shows, from left to right, a light source that may be of the type mentioned above, and that in particular takes the form of an array of emissive elements 1, a first lens 2, a second lens 3, a pupil 4 and a third lens 5.

This time, the pupil 4 is located close to the face 32 of the second lens; it may even make contact with the periphery of this face 32. As in the preceding case, the lens 3 is a meniscus lens. The lens 2 is of the same type as in the example of FIG. 2. The third lens this time has a planar entrance face 51 and a convex exit.

Figure 4:
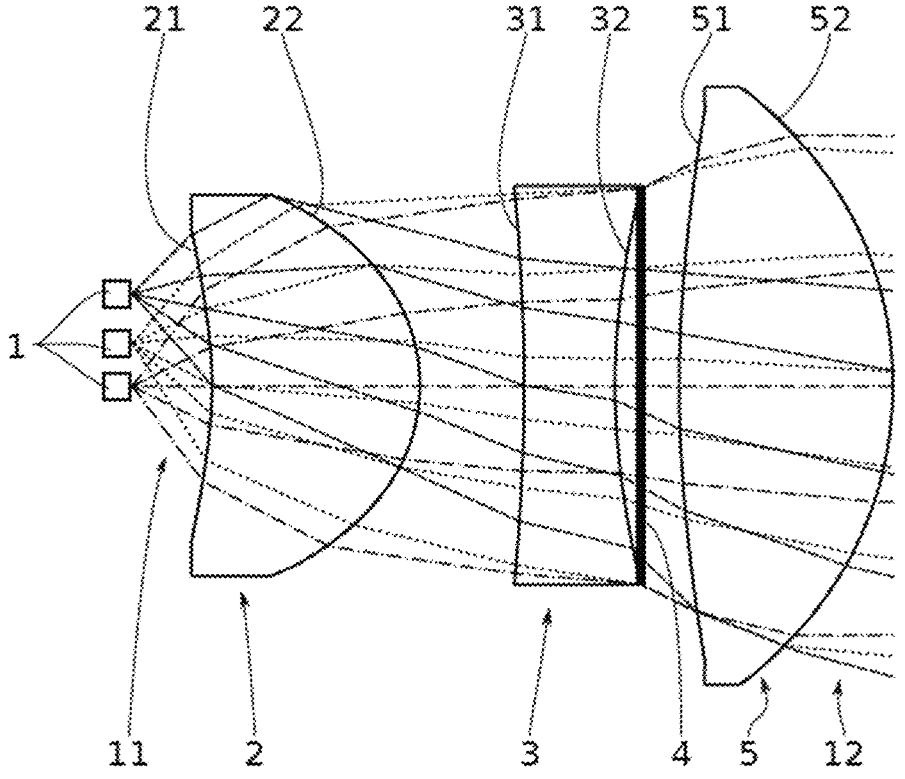
FIG. 4 shows another variant of embodiment.

The variant of FIG. 4 is quite similar. As above, the pupil 4 is located close to the face 32, and advantageously makes contact therewith. The second lens 3 is here biconcave. In contrast, the third lens 5 is biconvex. The first lens 2 is still a meniscus lens.

Association of a light source 1 such as described above with an optical device comprising the three lenses delivers a segmented resultant beam able to correspond to FIG. 1, with sufficient sharpness and an outline 61 of the dark tunnel region 6 that is fairly colorless. Preferably, the system further comprises a unit for driving the selective activation of the light-emitting elements.

The system may comprise computerized processing means, in particular with a processor and a non-volatile memory for storing computer program instructions making it possible to carry out the operations of determining the emissive elements to be activated and the emissive elements to be deactivated depending on the beam to be formed and on the dark regions to preserve.

The invention is not limited to the embodiments described above and encompasses any embodiment conforming to its spirit.

What is claimed is:

1. An optical device for projecting light beams configured to interact with a pixelated light source comprising:

a plurality of selectively activated emissive elements, successively in a direction of a path of light rays generated by the pixelated light source including:

a convergent first lens, a divergent or neutral second lens, a pupil, and a convergent third lens;

wherein the pupil is placed so as to avoid contact with an exit face of the divergent or neutral second lens and with an entrance face of the convergent third lens; and wherein the pupil is placed at a distance from a center of the exit face of said second lens between 25% and 75% of a distance between the center of the exit face and a center of the entrance face of the convergent third lens.

2. The device of claim 1, wherein the convergent first lens is a meniscus lens.

3. The device of claim 1, wherein the divergent or neutral second lens is a meniscus lens.

4. The device of claim 1, wherein the convergent third lens is a lens of uniform refractive index.

5. The device of claim 1, wherein said second lens has an exit face having a center located on an optical axis of the device;

wherein the convergent third lens has an entrance face having a center located on the optical axis of the device.

6. The device of claim 5, wherein the pupil is placed at a distance from center of the exit face of said second lens between 25% and 75% of a distance between the center of the exit face and a center of the entrance face of the convergent third lens.

7. The device as claimed in claim 5, wherein the pupil makes contact with an edge of the exit face of said second lens.

8. The device as claimed in claim 1, wherein the pupil is placed at a distance from the center of the exit face of said second lens between 45% and 55% of the distance between the center of the exit face and a center of the entrance face of the convergent third lens.

9. A module comprising:

an optical device and a pixelated light source that is equipped with a plurality of selectively activatable emissive elements;

the selectively activatable emissive elements configured to emit a segmented light beam with the optical device successively in a direction of a path of light rays generated by the pixelated light source; and the optical device including: a convergent first lens, a divergent or neutral second lens, a pupil, and a convergent third lens.

10. The module of claim 9, wherein the first lens includes an entrance face directly receiving light from the pixelated light source.

11. The module of claim 9, wherein the convergent third lens is configured to produce a projection of the segmented light beam in front of a vehicle.

12. The module of claim 9, further including a unit for driving an activation of each of the selectively activated emissive elements that is configured to produce a dark region in a projected beam by deactivating a group of adjacent emissive elements;

the unit for driving being configured to determine a number of light emissive elements of the group of adjacent emissive elements corresponding to the dark region depending on a widthwise dimension of the light emissive elements.

13. The module of claim 9, wherein the segmented light beam forms at least a portion of an overall high beam.

* * * * *